UNITED STATES PATENT OFFICE.

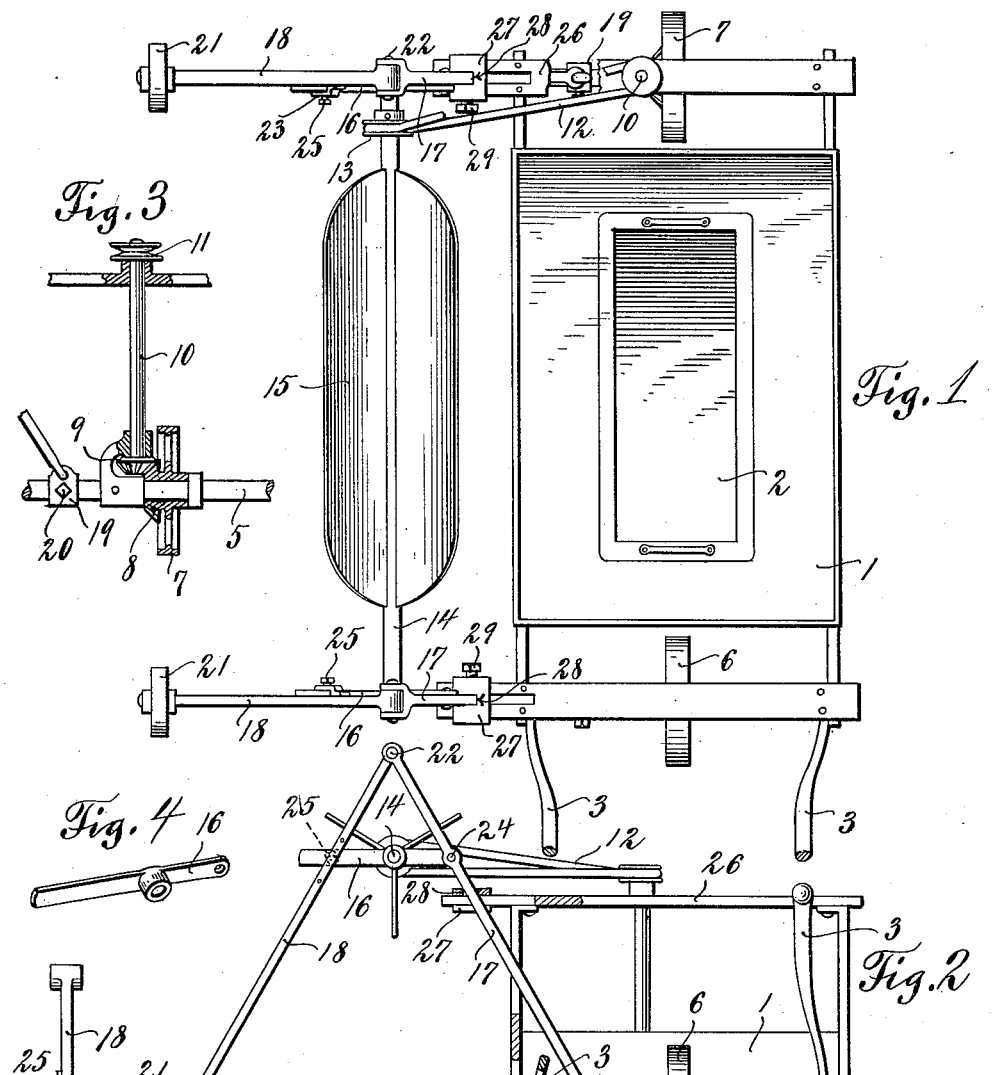

EMIL PRYTZ, OF SHARON, NORTH DAKOTA.

INSECT-EXTERMINATOR.

1,008,196. Specification of Letters Patent. Patented Nov. 7, 1911.

Application filed February 27, 1911. Serial No. 611,095.

*To all whom it may concern:*

Be it known that I, EMIL PRYTZ, a subject of the King of Norway, residing at Sharon, in the county of Steele and State of North Dakota, have invented certain new and useful Improvements in Insect-Exterminators, of which the following is a specification.

This invention relates to agricultural machines of the type ordinarily called insect or bug exterminators, and used for forcibly operating upon plants or similar growth to detach therefrom insects, bugs or other parasites, the machine embodying a receptacle or body to receive the insects, and wherein they may be destroyed.

The invention embodies essentially a special construction of frame-work for the machine, supporting a rotary beater in such a way as to afford a desirable adjustment of such beater to accommodate the machine to passage over fields where the rows of plants may be of different distances apart, or where the growths to be operated upon for the desired purpose may be of different heights.

For a full understanding of the present invention, reference is to be had to the following description and to the accompanying drawings, wherein—

Figure 1 is a top plan view of the machine embodying the invention; Fig. 2 is an end elevation, certain parts of the frame being shown in section; Fig. 3 is a fragmentary sectional view showing more clearly the driving mechanism for the beater; Fig. 4 is a detail perspective view of one of the adjustable arms provided with a bearing for the beater shaft; Fig. 5 is a detail view, partly broken away, of the outer member of one of the end frames; Fig. 6 is a transverse sectional view through the body of the machine and which forms a receptacle; Fig. 7 is a perspective view of the pan; Fig. 8 is a plan view of an adjustable bracket.

Throughout the following detail description and on the several figures of the drawings, similar parts are referred to by like reference characters.

Referring to the drawings and describing the machine of this invention specifically, 1 denotes the body of the machine which is in the form of a box, providing a large receptacle, a removable pan 2 being supported in the middle portion of the body or receptacle 1 so as to receive oil, or some poison by which bugs or insects falling into the receptacle may be killed or destroyed. Extending from one end of the body 1 are the handles or draft means 3, whereby the machine may be advanced over the field manually or by draft animals. Spaced from the opposite ends of the body 1 are the axles 5 on which are mounted ground wheels 6 and 7, the wheel 7 having a bevel gear 8 meshing with a similar gear 9 on a vertical shaft 10, the latter having at its upper end a pulley 11 around which passes the belt 12, the belt extending to a similar pulley 13 on the beater shaft 14. The shaft 14 carries the beater 15, the latter consisting of a plurality of radiating paddles or blades.

The beater 15 is peculiarly mounted in that its shaft is supported in bearings provided in horizontal arms 16, each of which forms a part of an end frame extending laterally from the body 1 of the machine. The end frame referred to consists of the inner and outer side members 17 and 18 respectively, the inner member 17 being pivoted at its lower end to a bracket 19 on the adjacent axle 5, which bracket is adjustable along the axle by means of a set screw 20. The outer member 18 of each end frame has a wheel 21 supported on its lower end while the upper end of said member is pivotally connected at 22 with the corresponding end of the inner member 17. On one side of the outer member 18 is attached a keeper 23 through which the outer end portion of the arm 16 is adapted to pass, the inner end of said arm 16 being pivoted at 24 to the inner side member 17 of the frame. A set screw 25 carried by the keeper 23 is adapted to engage the arm 16 to hold the latter at a predetermined adjustment and maintain the members 17 and 18 adjusted in proper relative positions. The member 16 therefore not only forms a support for one end of the beater shaft 14 but it affords a means for adjusting the positions of the side members 17 and 18 to accommodate the same to the width of the rows of plants over which the machine may be advanced. The members 17 and 18 are adapted for bodily adjustment, so to speak, by means of the provision on a horizontal bar 26 of the frame of the machine, of a sliding bracket 27. The bracket 27 has a vertical opening 28, as shown in Fig. 8, and the inner side member 17 of the coöperating end frame passes through said opening 28, affording the necessary connection between the parts 27 and 17. Adjustment of a set screw 29 on a side of the bracket 27 will hold the member 17 and other members connected therewith at a desired adjustment, and it will be apparent that, by reason of the adjustable means afforded by the parts 19, 23 and 27, the beater 15 may be adjusted laterally and to a certain extent vertically.

The driving connection between the wheel 7 and the beater shaft through the belt 12 will rotate the beater constantly as the machine is in motion, and it is contemplated that the beater shall operate directly upon the plants or other growth, forcibly knocking or beating from the latter, insects or bugs preying thereupon, said insects dropping into the box or receptacle 1 of the machine, and being adapted to be destroyed therein in an evident manner.

Having thus described the invention, what is claimed as new is:

1. In an insect exterminating machine, the combination of a body comprising a receptacle, a beater shaft arranged at one side of the body, a beater supported thereon, and end frames projecting laterally from the opposite ends of the body to support the beater shaft, each end frame being composed of inner and outer members, means connecting said members together, adjustable connections between the lower end of the inner member and the body of the machine, and other adjustable connections between the intermediate portion of the inner member and the body of the machine.

2. In an insect exterminating machine, the combination of a body comprising a receptacle, a beater shaft spaced from one side of the body, a beater mounted thereon, horizontal frame bars at opposite ends of the body and end frames projecting laterally from the opposite ends of the body, and comprising inner and outer side members pivotally connected at their upper ends, an arm connecting said side members intermediate their ends and having a bearing for the beater shaft, and an adjustable connection between the inner side member and said horizontal frame bar.

3. In an insect exterminating machine, the combination of a body comprising a receptacle, a beater shaft spaced from one side of the body, a beater mounted thereon, horizontal frame bars at opposite ends of the body and end frames projecting laterally from the opposite ends of the body, and comprising inner and outer members pivotally connected at their upper ends, an adjustable pivotal connection between the lower end of the inner side member and the body of the machine, an arm pivotally connected with one of the side members and adjustably connected with the other side member and having a bearing for the beater shaft, and an adjustable connection between said inner side member and the horizontal bar.

4. In an insect exterminating machine, the combination of a body comprising a receptacle, ground wheels at opposite ends of the body, axles supporting said wheels, a beater shaft spaced from one side of the body, a beater carried thereby, and end frames projecting laterally from the opposite ends of the body and supporting the beater shaft, and ground wheels carried by the outer ends of said end frames.

5. In an insect exterminating machine, the combination of a body comprising a receptacle, ground wheels at opposite ends of the body, axles supporting said wheels, a beater shaft spaced from one side of the body, a beater carried thereby, end frames projecting laterally from the opposite ends of the body and supporting the beater shaft, and ground wheels carried by the outer ends of said end frames, and means for adjusting the positions of portions of each end frame to vary the vertical and lateral adjustment of the beater shaft.

In testimony whereof I affix my signature in presence of two witnesses.

EMIL PRYTZ.

Witnesses:
  C. G. BADKEN,
  J. M. JOHNSON.

---

Copies of this patent may be obtained for five cents each, by addressing the "Commissioner of Patents, Washington, D. C."